United States Patent
Schmidt et al.

(10) Patent No.: US 8,012,371 B2
(45) Date of Patent: Sep. 6, 2011

(54) LUMINESCENT MATERIAL

(75) Inventors: Peter J. Schmidt, Aachen (DE);
Thomas Juestel, Witten (DE); Walter Mayr, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 749 days.

(21) Appl. No.: 12/064,096

(22) PCT Filed: Aug. 14, 2006

(86) PCT No.: PCT/IB2006/052796
§ 371 (c)(1),
(2), (4) Date: Feb. 19, 2008

(87) PCT Pub. No.: WO2007/023410
PCT Pub. Date: Mar. 1, 2007

(65) Prior Publication Data
US 2009/0032772 A1     Feb. 5, 2009

(30) Foreign Application Priority Data

Aug. 24, 2005  (EP) .................... 05107759

(51) Int. Cl.
*C09K 11/66* (2006.01)
(52) U.S. Cl. ............... 252/301.4 R; 428/403; 428/404; 313/486; 252/301.4 F; 252/301.4 P; 252/301.4 S; 252/301.4 H; 252/301.5; 252/301.6 R; 252/301.6 S; 252/301.6 F; 252/301.6 P
(58) Field of Classification Search ........... 313/486; 428/403, 404; 252/301.4 R–301.6 S
See application file for complete search history.

(56) References Cited

U.S. PATENT DOCUMENTS

| | | | | |
|---|---|---|---|---|
| 4,024,298 A * | 5/1977 | Mossman | | 427/64 |
| 4,691,140 A * | 9/1987 | Sakakibara et al. | | 313/486 |
| 5,036,249 A * | 7/1991 | Pike-Biegunski et al. | | 313/509 |
| 6,504,320 B2 * | 1/2003 | Feldmann et al. | | 315/289 |
| 6,761,971 B2 * | 7/2004 | Raukas et al. | | 428/403 |
| 6,811,813 B1 | 11/2004 | Tian | | |
| 7,678,293 B2 * | 3/2010 | Braune et al. | | 252/301.4 R |
| 2002/0105266 A1 * | 8/2002 | Juestel et al. | | 313/512 |
| 2002/0140338 A1 * | 10/2002 | Sluzky | | 313/461 |
| 2004/0152147 A1 | 8/2004 | Looker et al. | | |
| 2004/0166318 A1 | 8/2004 | Park et al. | | |
| 2006/0222757 A1 * | 10/2006 | Loureiro et al. | | 427/64 |

FOREIGN PATENT DOCUMENTS

| | | | |
|---|---|---|---|
| DE | 3931691 | * | 4/1991 |
| EP | 0217338 B1 | | 4/1987 |
| EP | 1560274 A1 | | 8/2005 |
| JP | 63284290 A | | 11/1988 |
| JP | 11149906 A | | 6/1999 |
| JP | 2005011665 A1 | | 1/2005 |
| WO | WO 2004/074400 | * | 9/2004 |

OTHER PUBLICATIONS

T. Justel, et al: Optimization of Luminescent Materials for Plasma Display Panels, Advanced Material, vol. 12, No. 7, 2000, pp. 527-530.

(Continued)

*Primary Examiner* — C. Melissa Koslow

(57) ABSTRACT

The invention relates to a luminescent material comprising a luminescent particle (20) for generating light (4), wherein the luminescent particle (20) has a structured particle surface for effectively outcoupling the light (4) generated within the luminescent particle (20). Furthermore, the invention relates to a light source comprising a luminescent material according to the invention and a device for exciting the luminescent material.

12 Claims, 2 Drawing Sheets

OTHER PUBLICATIONS

Figure 1:
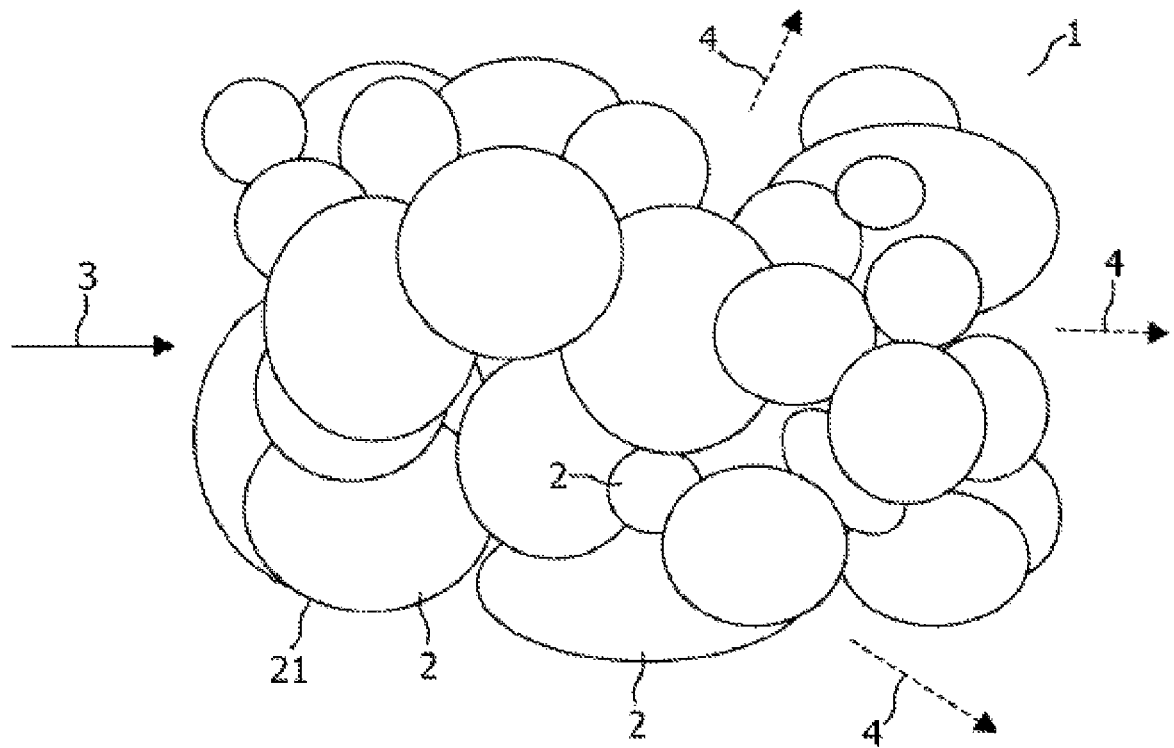

B. L. Abrams, et al: Degradation of Nanoparticulate-Coated and Uncoted Sulfide-Based Cathodoluminescent Phosphors, Review on Advanced Materials Science, vol. 5, 2003, pp. 139-146.

Jau-Ho Jean, et al: Y2O2S: Eu Red Phosphor Powders Coated with Silica, Journal of the Electochemical Society, vol. 83, Feb. 18, 2000, pp. 1928-1934.

* cited by examiner

LUMINESCENT MATERIAL

The invention relates to an effective luminescent material in luminescent devices.

Luminescent materials are used for emitting light, for example, in devices for room illumination or in displays. The light emission of the luminescent materials is excited by means of an excitation source. The excitation source can emit, for example, primary radiation of a shorter wavelength, or an electron beam. The energy (primary energy) radiated by the excitation source is converted at least partly into visible radiation by the luminescent material. Important quality parameters for luminescent materials are the effectiveness with which the primary energy is converted into visible light by the luminescent materials and the stability of the luminescent materials vis-à-vis chemical or thermal degradation of their excitation and emission characteristics. Typical luminescent materials (phosphors) are materials of non-organic particles, which have a crystalline structure with spherical, hexagonal or tetragonal morphologies with smooth surfaces that are not much structured and a tight particle size distribution in the range of diameters from 2 to 10 µm. To some extent, the individual non-organic particles (phosphor particles) are still provided with a homogeneous surface coating for improving the life span characteristics.

Document US2004/0166318 discloses phosphors, for example, a ZnS doped with copper, aluminum or gold having a uniform, smooth and complete surface coating of rare earth oxides, for example, $Y_2O_3$. The surface coating may have thicknesses larger than 1 nm, preferably between 10 nm and 1000 nm and is applied on the phosphor particles as a rare earth hydroxide solution by means of a gel process with subsequent temperature and drying steps. The complete surface coating represents a chemical protective cover for the phosphor material and thus prevents chemical degradation of the luminescence characteristics of the phosphor particle, for example, by oxidation or hydrolysis. Additionally, the complete cover prevents the formation of recombination centers, which has a positive effect on the excitation efficiency (internal yield) of the phosphor particle.

However, the efficiency of a luminescent material (phosphor or also luminescent material) is not only determined by the excitation efficiency of the phosphor particles, but also by the outcoupling efficiency of the light generated in and coupled out of the phosphor particles. Due to the difference of the refractive index of the phosphor material relative to the surrounding material, typically air or vacuum having a refractive index 1, a part of the generated light is back-reflected at the surface of the phosphor particle in accordance with the laws of refraction and traverses the phosphor particle again till it is incident on the surface of the phosphor particle at an angle smaller than the angle from which total reflection takes place, and is outcoupled. Thus, the optical path within the phosphor particle becomes very large for a part of the generated light. The probability of re-absorption of the light with a subsequent radiationless transfer from the excited electron state to the fundamental state within the phosphor particle increases with the length of the optical path covered within the phosphor particle. The portion of the light thus re-absorbed reduces the outcoupling efficiency of the phosphor particle and hence the total efficiency of the luminescent material.

It is therefore an object of the invention to provide a luminescent material having a high outcoupling efficiency.

This object is achieved by a luminescent material comprising a luminescent particle for generating light, wherein the luminescent particle has a structured particle surface for improved outcoupling of the light generated within the luminescent particle. The light generated in the particle is also denoted hereinafter as secondary radiation. With a structured surface, it is very likely that a ray of light back-reflected at the particle surface strikes the particle surface again at a different angle after it has once traversed the luminescent particle. With high probability, the locally varying spatial alignment of the particle surface leads to the outcoupling of the ray of light after one or a few renewed strikes of the ray of light on the particle surface. With this measure, the light outcoupling is improved in comparison with particles of the same material having smooth surfaces, and hence more light is coupled out of the particle.

In an embodiment of the luminescent material, the luminescent particle comprises a first luminescent material for generating light and a second material for structuring the particle surface. A second material having different material properties in comparison with the first material, for example, morphological properties, disturbs the particle surface in comparison with particles of the pure first material and thus leads to a structured particle surface.

In a further embodiment, the second material comprises at least one material of the group of transparent or luminescent materials. A transparent second material prevents re-absorption of the radiation generated in the particle, while a luminescent second material, in addition to the first material, contributes to the conversion of the primary energy into visible light.

In a further embodiment, the first material of a luminescent particle has a first surface and the second material is arranged on the first surface for generating the structured particle surface. Here, the outer surface of the material volume of the first material is to be understood as the first surface. Since first luminescent materials having a high internal yield typically have a crystalline structure with an even surface, the particle surface structured by adding a second material on the surface of the first material (first surface) can improve the outcoupling efficiency.

In a favorable embodiment, the second material covers more than 30% of the first surface of the luminescent particle. A distinct improvement of the outcoupling efficiency vis-à-vis luminescent materials having smooth surfaces is achieved with a coverage rate of more than 30%.

In a further embodiment, the first material has a first refractive index and the second material has a second refractive index which is smaller than or equal to the first refractive index. The portion of the light back-reflected due to total reflection is reduced and thus the outcoupling efficiency is increased by a two-stage optical transition from an optically dense first material via the optically thinner second material to the optically still thinner particle-surrounding medium, for example, air or vacuum having a refractive index n=1.

In a further embodiment, the second refractive index is between 1.5 and the first refractive index. The portion of the light, which is back-reflected at the boundary surface between the first and the second material due to total reflection, is reduced by the not too large difference between the first and the second refractive index.

In a further embodiment, the second material comprises at least one material of the group of $SiO_2$, $CaHPO_4$, $MgAl_2O_4$, $MgO$, $YPO_4$, $Al_2O_3$, $LaPO_4$, $LuPO_4$, $AlPO_4$.

In a further embodiment, the second material having wavelengths shorter than the wavelength of the light generated within the luminescent particle has a smaller reflectivity than the first luminescent material. In this way, more primary radiation can be coupled into the luminescent particles by choosing a suitable material for the second material.

In a further embodiment, the structured particle surface comprises at least one structure, which has at least one point with a height difference of more than 10 nm relative to a point in a local environment around the structure. A local environment is herein understood to be a plane around the structure of the order of magnitude of 1 to 5-fold the basic structure area projected on the average surface area of the particle. The term "structure" herein comprises all areas of the surface of the particle, which can be distinguished from their environment by their shape.

Furthermore, the invention relates to a light source comprising a luminescent material and a device for exciting the luminescent material. Here, excitation is denoted as the transfer of primary energy to the luminescent material for converting the primary energy into visible radiation.

These and other aspects of the invention are apparent from and will be elucidated with reference to the embodiments described hereinafter.

Figure 2:
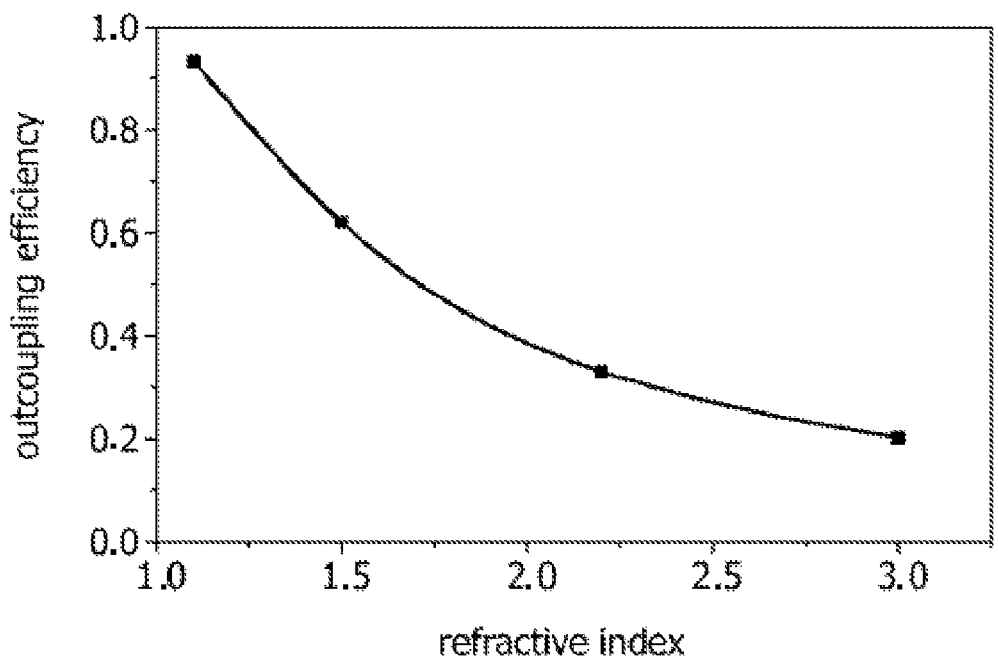
Figure 3:
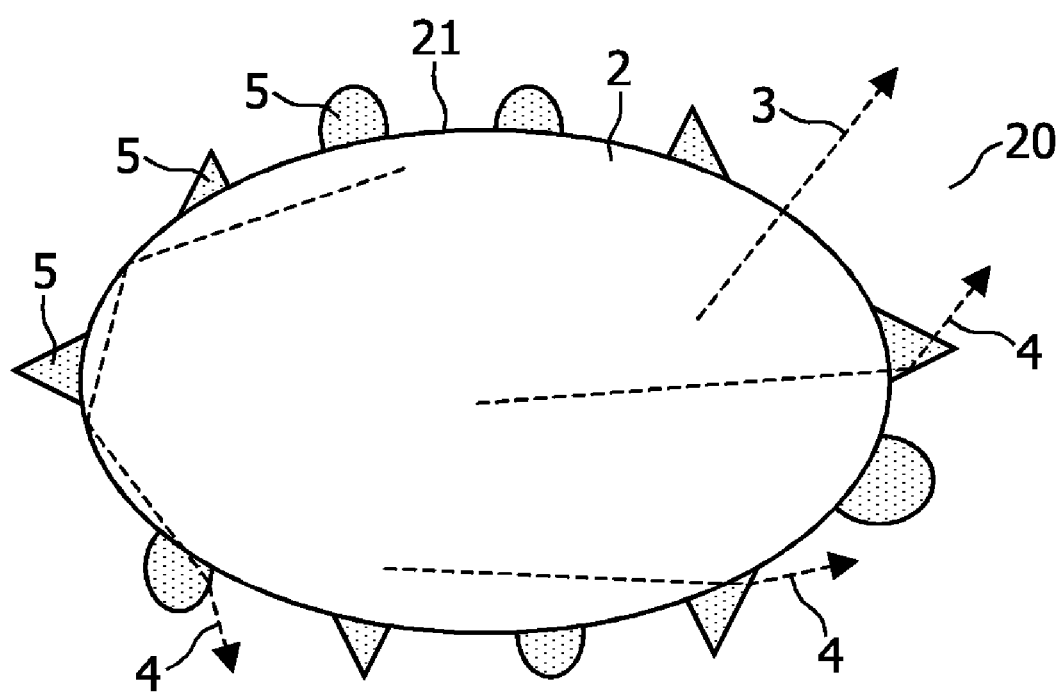

In the drawings:

FIG. 1 shows a luminescent material of luminescent particles in accordance with the state of the art, FIG. 2 shows the outcoupling efficiency of an ideally spherical luminescent particle as a function of the refractive index of the particle material, and FIG. 3 is a cross-section of a luminescent particle according to the invention, having a structured surface.

Typical luminescent materials (phosphors) are materials of non-organic particles (phosphor particles or luminescent particles), which have a crystalline structure with spherical, hexagonal or tetragonal morphology with smooth surfaces that are not much structured and can be regarded approximately as spherical. FIG. 1 schematically shows the three-dimensional structure of a luminescent material layer 1 of individual luminescent particles 2 with a respective surface 21 and having a production-dependent variation of the particle diameter. The luminescent material 1 is excited by means of primary radiation 3 for emitting secondary radiation 4, typically visible light. As primary radiation 3, for example, light of a wavelength shorter than the wavelength of the secondary radiation 4 or an electron beam having an appropriate radiation energy is used. After excitation has taken place, the luminescent particles 2 emit isotropically, wherein, depending upon the direction of propagation in the luminescent particle 2, the secondary radiation 4 is incident at an angle on the surface 21 of the particle, which surface is simultaneously the boundary surface between the particle 2 and the surrounding medium (usually air or vacuum), which secondary radiation incidence leads to an outcoupling of the light from the luminescent particles 2 or to a back reflection into the particle material, in accordance with the laws of refraction. In the case of a back reflection of the secondary radiation 4 at said surface 21, there is a material-dependent probability of re-absorption of the secondary radiation 4 by the particle material and a possible radiationless energy transition, which leads to a decrease of the luminous efficiency of the luminescent material 1.

In the example of the Eu-doped SrS-luminescent material, images with a secondary electron microscope (SEM) prove the smooth morphology of the surface 21 represented in FIG. 1 and the approximately spherical particle shape. Typical diameters of luminescent SrS:Eu particles are of the order of magnitude of 1 to 10 μm.

If luminescent particles 2 having an ideal spherical shape are available, the portion of the light, which cannot leave the luminescent particles 2 due to total reflection, can be computed from the Fresnel formulas. FIG. 2 shows the outcoupling efficiency of an ideal spherical particle 2 computed in accordance with the Fresnel formulas as a function of the refractive index. An outcoupling efficiency of 60% of the light generated in the luminescent particle 2 results for a refractive index of 1.6, which light decreases to below 30% for a refractive index of 2.4. The refractive indices of typical luminescent materials vary between 1.6 and 2.4. For example, the following luminescent materials have the following refractive indices n: $BaSO_4$ having n=1.64, $YPO_4$ having n=1.76, $LaPO_4$ having n=1.79, $Y_2O_3$ having n=1.90, $CaWO_4$ having n=1.92, CaS having n=2.14, SrS having n=2.11 or ZnS having n=2.37. For luminescent materials having a refractive index larger than 2, for example, sulfured luminescent materials, an outcoupling efficiency well below 50% is obtained in accordance with FIG. 2. Even with luminescent materials having small refractive indices, the outcoupling efficiency is well below 70%.

It is true that an efficiency which is higher than that computed in FIG. 2 for ideal spherical particles is found in practice, because the morphology of the phosphor particles usually deviates from a perfect spherical morphology. Nonetheless, also in practice, the theoretical outcoupling efficiency is well below 100%. For a large part of the light it is necessary to frequently traverse the phosphor particle before outcoupling takes place, which allows the probability of re-absorption within the phosphor particle to increase and thus allows the outcoupling efficiency to decrease still further.

According to the invention, the luminescent material comprises luminescent particles 20 having a structured particle surface as represented schematically in FIG. 3. The structured particle surface comprises structures 5, which have at least one respective point with a height difference of more than 10 nm relative to a point in a local environment around the structures. The structures 5 of the surface may be regular or irregular. FIG. 3 shows schematically in lateral section a luminescent particle 20 according to the invention, which particle has a structured surface with structures 5 for effectively outcoupling the secondary radiation 4 generated within the luminescent particle 20, typically visible light. The luminescent particle 20 comprises a first luminescent material 2 having a first outer surface 21 for generating light and structures 5, for example, of a second material for structuring the first surface 21 of the luminescent particle 20. For generating the structures 5, for example, the second material 5 was applied as an outer coating on the first surface 21 of the luminescent particle 20. In this representation, only one part of the first surface 21 is covered with the second material. In other embodiments, the first surface 21 can also be completely covered with structures of a second material. According to the invention, the second material helps in generating a structured surface of the particle 21. The shape of the applied second material can vary locally on the first surface 21, as represented schematically in FIG. 3 by dotted pyramids and dome-shaped structures 5. The second material may be transparent and/or self-luminescent.

To improve the outcoupling efficiency, the refractive index of the second material (second refractive index) should be between that of the luminescent first material 2 and that of the medium (typically air or vacuum), which surrounds the luminescent particle 21. The portion of the light back-reflected due to total reflection is decreased and thus the outcoupling efficiency is increased by a two-stage optical transition from an optically dense first material 2 via the optically thinner second material 5 to the optically still thinner particle-surrounding medium, for example, air or vacuum having a refractive index n=1. The difference between the first and second refractive indices of the first and second materials 2 and 5 should be as small as possible so as to reduce total reflection at the boundary surface between the first and the second material. Preferably, the refractive index of the second material is between 1.5 and that of the first material.

The second material may also be a self-luminescent material. In this case, the material volume, which is involved in converting the primary energy 3 into secondary radiation 4, increases. The first and the second material may also have the same material composition.

The production of a structured first surface 21 of a luminescent particle 20 according to the invention will be described by way of example with reference to the following examples of embodiments:

a) Luminescent YAG:Ce particle (refractive index n=1.90) having an $SiO_2$ coating (refractive index n=1.54) for generating a structured particle surface: 100 g of YAG:Ce (3.3%) were dispersed in 300 ml of ethanol in the ultrasound bath, the milky excess was decanted. The purified phosphor was dispersed in a three-neck flask with a KPG-stirrer in 700 ml of ethanol in the ultrasound bath. While stirring, 50 ml of concentrated $NH_3$ and 20 ml of tetraethoxysilane were then added and stirred for 2 hours. After 15 minutes, it was de-agglomerated with ultrasound for 10 seconds. The coated phosphor particles were then collected in a fluted filter and washed with ethanol. Subsequently, the coated phosphor particles were dried at 200° C. for 12 hours. Photometric data showed that YAG:Ce phosphor particles having surfaces structured in such a way had a 15% higher outcoupling efficiency than untreated YAG:Ce phosphor particles.

b) Luminescent SrS:Eu particles (refractive index n=2.11) having a SiO2 coating (refractive index n=1.54) for generating a structured particle surface: 100 g of SrS:Eu were suspended in 900 ml of ethanol (for example, in a three-neck flask, a glass stirrer, by means of ultrasound under exclusion of air) and mixed with 1 ml of tetramethoxysilane. After 10 minutes, 140 ml of concentrated ammonia were added. 70 ml of tetramethoxysilane in 200 ml of ethanol were then added within 20 minutes via a dropping funnel with pressure balance, wherein the batch was subjected to ultrasound in order to prevent agglomeration of the SrS:Eu particles. Subsequently, it was further stirred for three hours, filtered off and washed with ethanol. After drying, the phosphor particles coated with $SiO_2$ material were heat-treated in air at 250° C. for 12 hours. The SrS:Eu particles having a diameter of the order of magnitude of 10 μm were then coated with $SiO_2$ as the second material for generating structures 5 having a diameter of the order of magnitude of several 10 to 100 nm. The luminescent SrS:Eu particles completely coated with $SiO_2$ material had an outcoupling efficiency increased by 8.5% as compared to the uncoated SrS:Eu particles. The increase of the outcoupling efficiency was smaller as compared to the example of embodiment a), because SrS:Eu is characterized by small internal losses due to re-absorption with subsequent radiationless transitions.

It generally holds that the luminescent materials according to the invention have a higher outcoupling efficiency vis-à-vis the same luminescent materials having a smooth surface, as the internal re-absorption shown by the luminescent material with subsequent radiationless transitions is stronger. A measure of this effect is what is referred to as the absorption length, which may differ by more than a factor of 10 with luminescent materials, for example, due to the different aspect ratio with the disc or needle-shaped particles such as $BaMgAl_{10}O_{17}$:Eu (hexagonal disc-shaped particles) or LaOBr:Tb (tetragonal disc-shaped particles) or a different number of defect spots in the particle.

c) Luminescent $BaSi_2O_5$:Pb particles (refractive index n=1.55) having a $La_2O_3$ coating (refractive index n=1.79) for generating a structured particle surface: 125 mg of EDTA were added to a solution of 250 mg of $LaCl_3$ in 50 ml of distilled water. Then, the pH value was set at 7 by adding $Ba(OH)_2$. $Ba(OH)_2$ was added to 50 ml of distilled water until the pH value of 9.5 was obtained. Subsequently, 10 g of $BaSi_2O_5$:Pb were added to the alkaline solution. The La(EDTA) solution was added drop by drop to the $BaSi_2O_5$:Pb suspension. Here, EDTA stands for ethylenediamine tetra-acetic acid. After the addition of the complete La(EDTA) solution, the pH value was again set at 9.5 by adding Ba$(OH)_2$. The solution was stirred for 2 hours, after which the coated phosphor material was separated by filtration and dried at 80° C. Finally, the phosphor material was calcinated at 900° C. for 2 hours so as to remove crystal water and/or separate carbon dioxide. As a result of the precipitation of $La(OH)_3$, small $La_2O_3$ areas were formed at the surface of the $BaSi_2O_5$:Pb particles after annealing, which areas, together with the original surface, form a structured surface of the luminescent particle according to the invention.

The luminescent particles according to the invention, produced in such a way have an 8% higher outcoupling efficiency than untreated $BaSi_2O_5$:Pb phosphor particles. Chemical analyses by means of surface-sensitive electron diffraction proved that only 50% of the first surface of the luminescent particles was covered with $La_2O_3$ having a thickness of several 10 nm. According to the invention, a larger portion of the covered first surface would still further improve the outcoupling efficiency.

Based on the refractive index, further suitable transparent second materials for structuring the particle surface are, for example, $CaHPO_4$ (n=1.61), $MgAl_2O_4$ (n=1.72), MgO (n=1.74) or $Al_2O_3$ (n=1.77).

A structured particle surface for improved outcoupling of the light generated within the luminescent particle can also be generated by coating a luminescent particle, corresponding to FIG. 3, with the same material. For example, the surface of the luminescent $YPO_4$ particles can be coated with small $YPO_4$ particles (refractive index n=1.76) or $LaPO_4$ particles (refractive index n=1.79). The same also applies to other phosphor materials.

Besides growing particles on the surface of the original phosphor particle, for example, by precipitation of $SiO_2$, $La_2O_3$ or MgO, by hydrolysis of soluble precursors, the surface of luminescent particles can also be structured by the adhesion of nano-particles (particles having a diameter within the nanometer range), for example, nano-particulate $Al_2O_3$ (Alon-C) or $SiO_2$ on the surface of the original phosphor particles. The invention also comprises transparent and/or luminescent materials other than those referred to by way of example, which materials are applied by means of growing or adhesion on the original phosphor particle for generating an irregularly structured surface.

In a further embodiment, the second material having wavelengths shorter than the wavelength of the light (secondary radiation) generated within the luminescent particle has a smaller reflectivity than the first luminescent material. By suitable choice of the second material, more primary radiation can be coupled into the luminescent particles. Thus, for example, a complete $SiO_2$ coating of a luminescent SrS:Eu particle reduces the reflectivity of the particle from 22% (uncoated) to 18% (coated). In conformity with the smaller reflectivity, more primary radiation can be coupled into the luminescent particle for the excitation of the luminescent material, which leads to a higher effectiveness of the light source. When using a second material having a smaller reflectivity than the first material, the envisaged reflectivity reduction is a function of the rate of coverage of the first surface with the second material.

Furthermore, the first surface 21 of a luminescent particle 20 can also be structured by treating the surface without an additionally applied second material. For example, surfaces can be modified by grinding processes, chemical etching, electrochemical etching or by suitable particle bombardment, so that a structure deviating from an essentially smooth surface can be generated in the surface. For example, the surface of ZnS can be roughened by an acid treatment. However, this type of surface modification can lead to a smaller internal yield due to radiationless transitions caused by defect conditions.

The addition of suitable second materials, which are completely surrounded by luminescent material, might also disturb the growth process of luminescent particles in such a way that no smooth surface of the particle is formed. This technique also yields luminescent materials having a structured particle surface according to the invention, without the necessity of applying a second material on the first surface of the luminescent material at a later stage.

The embodiments explained with reference to the Figures and the description only represent examples for improving the outcoupling efficiency of a luminescent material according to the invention and should not be construed as limiting the claims to these examples. Those skilled in the art will be able to conceive alternative embodiments without departing from the protective scope of the appended claims. The mere fact that certain measures are recited in mutually different dependent claims does not indicate that a combination of these measures cannot be used to advantage.

The invention claimed is:

1. A luminescent material comprising a luminescent particle for generating light, wherein the luminescent particle has an irregularly structured particle surface for improved outcoupling of the light generated within the luminescent particle, wherein the luminescent particle comprises a first luminescent material having a first surface and a second non-luminescent material that creates the structured particle surface upon the first surface, and the structured particle surface comprises at least one structure that has at least one point with a height difference of more than 10 nm relative to a point in a local environment around the structure.

2. The luminescent material of claim 1, wherein the second material covers more than 30% of the first surface.

3. The luminescent material of claim 1, wherein the first material has a first refractive index and the second material has a second refractive index which is smaller than or equal to the first refractive index.

4. The luminescent material of claim 3, wherein the second refractive index is between 1.5 and the first refractive index.

5. The luminescent material of claim 1, wherein the second material, for wavelengths shorter than the wavelength of the light generated within the luminescent particle, has a smaller reflectivity than the first luminescent material.

6. The luminescent material of claim 1, wherein the first luminescent material comprises at least one material of the group of $BaSO_4$, $YPO_4$, $LaPO_4$, $CaWO_4$, $CaS$, and $SrS$.

7. A luminescent material comprising a luminescent particle for generating light, wherein the luminescent particle has an irregularly structured particle surface for improved outcoupling of the light generated within the luminescent particle, the luminescent particle comprises a first luminescent material having a first surface, and a second material that creates the structured particle surface upon the first surface, the second material comprises at least one material of the group of $CaHPO_4$, $MgAl_2O_4$, $YPO_4$, and $LuPO_4$, and the structured particle surface comprises at least one structure that has at least one point with a height difference of more than 10 nm relative to a point in a local environment around the structure.

8. The luminescent material of claim 7, wherein the first material has a first refractive index and the second material has a second refractive index which is smaller than or equal to the first refractive index.

9. The luminescent material of claim 8, wherein the second refractive index is between 1.5 and the first refractive index.

10. The luminescent material of claim 7, wherein the second material, for wavelengths shorter than the wavelength of the light generated within the luminescent particle, has a smaller reflectivity than the first luminescent material.

11. A luminescent material comprising a luminescent particle for generating light, wherein the luminescent particle has a structured particle surface for improved outcoupling of the light generated within the luminescent particle, and wherein the luminescent particle consists of a single material, wherein the structured particle surface comprises at least one structure that has at least one point with a height difference of more than 10 nm relative to a point in a local environment around the structure.

12. A light source comprising the luminescent material of claim 11 and a device for exciting the luminescent material.

* * * * *